(12) United States Patent
Choi

(10) Patent No.: US 7,826,806 B2
(45) Date of Patent: Nov. 2, 2010

(54) MOBILE TERMINAL

(75) Inventor: Byung-Sung Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 605 days.

(21) Appl. No.: 11/649,850

(22) Filed: Jan. 5, 2007

(65) Prior Publication Data

US 2008/0096616 A1    Apr. 24, 2008

(30) Foreign Application Priority Data

Oct. 18, 2006    (KR) .................. 10-2006-0101549

(51) Int. Cl.
*H04B 1/38* (2006.01)
(52) U.S. Cl. ............... 455/90.3; 455/550.1; 455/575.1; 455/347; 200/310; 200/311; 200/313; 200/314; 200/317; 200/305
(58) Field of Classification Search .............. 455/550.1, 455/556.1, 556.2, 575.1, 575.3, 575.4, 575.8, 455/90.3, 347; 200/310, 311, 313, 314, 317, 200/305
See application file for complete search history.

(56) References Cited

U.S. PATENT DOCUMENTS

| | | | | |
|---|---|---|---|---|
| 3,576,962 A * | 5/1971 | Nicolas | .................. | 200/314 |
| 3,811,025 A | 5/1974 | Bach | | |
| 4,262,182 A | 4/1981 | Basler et al. | | |
| 4,343,975 A * | 8/1982 | Sado | .................. | 200/314 |
| 4,419,555 A * | 12/1983 | Kim | .................. | 200/314 |
| 4,491,692 A | 1/1985 | Lee | | |
| 5,128,842 A * | 7/1992 | Kenmochi | .................. | 362/95 |
| 5,225,818 A * | 7/1993 | Lee et al. | .................. | 345/170 |
| 5,384,459 A * | 1/1995 | Patino et al. | .................. | 250/229 |
| 5,397,867 A * | 3/1995 | Demeo | .................. | 200/5 A |
| 5,401,927 A * | 3/1995 | Lundell et al. | .................. | 200/314 |
| 5,408,060 A * | 4/1995 | Muurinen | .................. | 200/314 |
| 5,491,313 A * | 2/1996 | Bartley et al. | .................. | 200/310 |
| 5,573,107 A * | 11/1996 | Nakano et al. | .................. | 200/314 |
| 5,613,599 A * | 3/1997 | Inagaki et al. | .................. | 200/512 |
| 5,664,667 A * | 9/1997 | Kenmochi | .................. | 200/314 |
| 5,669,486 A * | 9/1997 | Shima | .................. | 200/314 |
| 5,847,336 A * | 12/1998 | Thornton | .................. | 200/5 A |
| 5,950,808 A * | 9/1999 | Tanabe et al. | .................. | 200/314 |
| 5,975,711 A * | 11/1999 | Parker et al. | .................. | 362/24 |
| 6,704,004 B1 * | 3/2004 | Ostergård et al. | .......... | 345/170 |
| 6,738,475 B1 | 5/2004 | Lieber | | |

(Continued)

FOREIGN PATENT DOCUMENTS

DE    90 00 828.6    5/1990

(Continued)

*Primary Examiner*—Edward Urban
*Assistant Examiner*—RuiMeng Hu
(74) *Attorney, Agent, or Firm*—Birch, Stewart, Kolasch & Birch, LLP

(57) ABSTRACT

A mobile terminal is provided that includes a housing having an opening formed therein, a cover disposed in the opening of the housing, the cover including at least one light transmission opening, an input switch located beneath the opening of the housing and the at least one light transmission opening, a light emitter to illuminate the at least one light transmission opening, and a light constraining member to direct light from the light emitter towards the light transmission opening and to minimize light emitted from the light emitter from being directed peripherally of the light transmission opening.

16 Claims, 6 Drawing Sheets

U.S. PATENT DOCUMENTS

| | | | |
|---|---|---|---|
| 6,803,903 B1* | 10/2004 | Ostergård et al. | 345/168 |
| 6,806,815 B1* | 10/2004 | Kaikuranta et al. | 341/22 |
| 6,868,259 B1* | 3/2005 | Kitamura et al. | 455/90.3 |
| 7,005,595 B1* | 2/2006 | Tang | 200/310 |
| 7,015,408 B2* | 3/2006 | Hirahata et al. | 200/310 |
| 7,027,036 B2* | 4/2006 | Yang | 345/170 |
| 7,075,024 B2* | 7/2006 | Maeda et al. | 200/310 |
| 7,186,935 B2* | 3/2007 | Lee et al. | 200/310 |
| 7,230,195 B2* | 6/2007 | Ohnishi | 200/302.1 |
| 7,266,397 B2* | 9/2007 | Sato et al. | 455/575.1 |
| 7,271,360 B2* | 9/2007 | Kobayashi | 200/314 |
| 7,335,844 B2* | 2/2008 | Lee et al. | 200/310 |
| 7,340,273 B2* | 3/2008 | Ono | 455/550.1 |
| 7,442,889 B2* | 10/2008 | Lee et al. | 200/314 |
| 2002/0168948 A1* | 11/2002 | Watanabe | 455/90 |
| 2003/0202336 A1* | 10/2003 | Ostergard et al. | 362/24 |
| 2004/0082367 A1* | 4/2004 | Nakanishi et al. | 455/566 |
| 2004/0204196 A1* | 10/2004 | Dunican et al. | 455/575.1 |
| 2005/0056531 A1* | 3/2005 | Yu et al. | 200/310 |
| 2005/0150753 A1* | 7/2005 | Hsu | 200/314 |
| 2006/0197674 A1* | 9/2006 | Nakajima | 340/825.25 |
| 2006/0260921 A1* | 11/2006 | Lee et al. | 200/313 |
| 2006/0289283 A1* | 12/2006 | Jung et al. | 200/310 |
| 2007/0007118 A1* | 1/2007 | Lee et al. | 200/314 |
| 2007/0012553 A1* | 1/2007 | Lee et al. | 200/310 |
| 2007/0105604 A1* | 5/2007 | Choo et al. | 455/575.3 |
| 2007/0111750 A1* | 5/2007 | Stohr et al. | 455/550.1 |
| 2007/0240973 A1* | 10/2007 | Lee et al. | 200/314 |
| 2008/0128254 A1* | 6/2008 | Jung et al. | 200/512 |

FOREIGN PATENT DOCUMENTS

| | | |
|---|---|---|
| DE | 198 15 014 A1 | 10/1999 |
| DE | 102 60 297 A1 | 7/2004 |
| EP | 1 542 433 A1 | 6/2005 |
| EP | 1 635 550 A1 | 3/2006 |
| GB | 2357930 A | 7/2001 |
| RU | 99123432 A | 10/2001 |
| WO | WO-98/47123 A2 | 10/1998 |
| WO | WO-98/56152 A1 | 12/1998 |

* cited by examiner

MOBILE TERMINAL

CROSS REFERENCE TO RELATED APPLICATIONS

This application claims the benefit of Korean Patent Application No. 10-2006-0101549, filed Oct. 18, 2006, and is herein incorporated by reference.

BACKGROUND OF THE INVENTION

1. Field of the Invention

The present invention relates to a mobile terminal and, more particularly, to a mobile terminal having an exterior housing that serves a particular function, thus improving the usefulness of the using.

2. Description of Related Art

In general, a mobile terminal, including mobile phones, PDAs, digital camera, and MP3 players, is a mobile electronic device that has one or more functions such as allowing users to wirelessly transmit and receive information, read or process information, capture video or images, and enjoy music or video while traveling.

In recent trends, mobile terminals are becoming lighter and more compact along with a development of information communication technologies, even as mobile terminals advance toward integrated mobile devices allowing users to use and enjoy multimedia.

With this multi-functionality, conventional mobile terminals need to provide a sufficient mechanical support to implement various functions within a small and limited device and an interface environment for allowing users to conveniently and easily use the functions.

A keypad unit mounted on an outer surface of a mobile terminal can be actively utilized in addition to its inherent function of simply inputting keys for the user interface environment. However, in general, as the keypad unit includes a plurality of keys, it causes the mobile terminal to have various curves or bent portions, thereby affecting the aesthetics of the mobile terminal and further complicating the mobile terminal.

BRIEF SUMMARY OF THE INVENTION

One exemplary feature of the present invention is to provide a mobile terminal having an aesthetically enhanced exterior by not forming complicated patterns and shapes on the exterior of the mobile terminal.

According to principles of the present invention, a mobile terminal is provided that includes a housing having an opening formed therein, a cover disposed in the opening of the housing, the cover including at least one light transmission opening, an input switch located beneath the opening of the housing and the at least one light transmission opening, a light emitter to illuminate the at least one light transmission opening, and a light constraining member to direct light from the light emitter towards the light transmission opening and to minimize light emitted from the light emitter from being directed peripherally of the light transmission opening.

In another aspect, the cover and the housing may form an exterior of the mobile terminal.

In a further aspect, a display may be disposed in the housing, and the cover together with the display form a front surface of the mobile terminal.

In another aspect, a key input unit may be provided approximately at the center of the cover.

In a different aspect, a display may be disposed approximately at the center of the cover.

In still another aspect, the cover may be formed as one body that partially includes two adjacent surfaces of the mobile terminal. Each adjacent surface has a light transmission opening and an input switch associated therewith.

In another aspect, the cover may be formed as one body that partially includes three adjacent surfaces of the mobile terminal. Each adjacent surface has a light transmission opening and an input switch associated therewith.

In yet another aspect, the cover may include two cover portions. In addition, each of the cover portions may be formed as one body that partially includes three adjacent surfaces of the mobile terminal. Each adjacent surface has a light transmission opening an input switch associated therewith.

In a different aspect, the display reflects light when turned off.

In another aspect, the input switch may be located above a circuitry supporting substrate having a contact pattern. The input switch may be a metallic dome that is elastically deformable to contact the contact patterns when the cover is pressed.

In a further aspect, the cover may be a metallic plate.

In a still further aspect, the light constraining member may include a pressing protrusion that extends toward the metallic dome. The pressing protrusion is attached at an inner side of the cover. The pressing protrusion may be made of a light transmissive material and the light emitter is located adjacent the metallic dome.

In an even further aspect, the light constraining member may include a shield made of a light non-transmissive material. The shield is provided near the pressing protrusion in order to minimize light emitted from the light emitter from being directed peripherally of the light transmission opening. The light constraining member may be a unitary member and may be formed of silicone.

In another aspect, stopping portions that prevent the cover from being pressed outward beyond the front surface may be provided. Each stopping portion may first extend in a direction away from the front surface of the mobile terminal from an edge portion of the cover and then outwards to engage an interior surface of the housing.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the exemplary embodiments of the present invention, examples of which are illustrated in the accompanying drawings. Hereinafter, mobile terminals according to the present invention will be explained in more detail.

Figure 1:
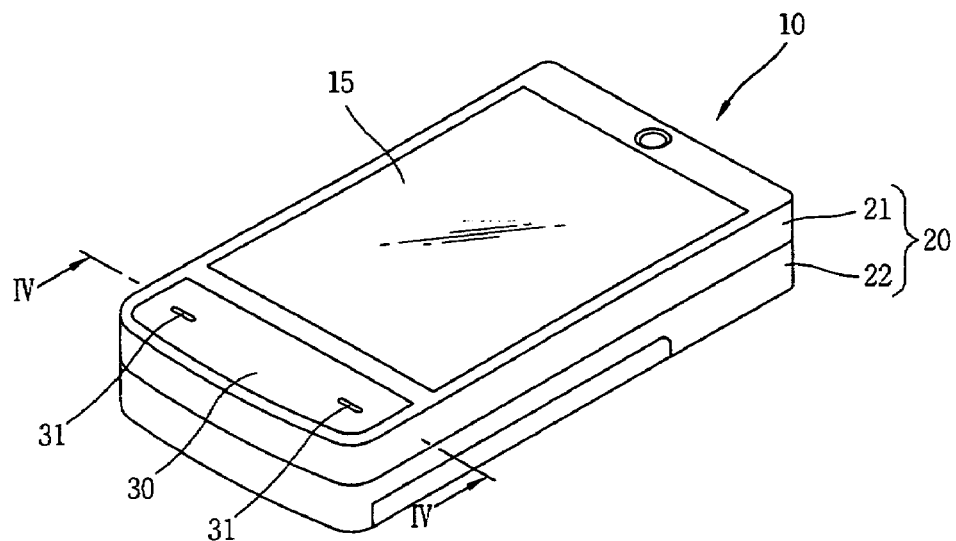
FIG. 1 is a perspective view of a mobile terminal according to a first exemplary embodiment of the present invention.

With reference to FIG. 1, a mobile terminal 10 includes a housing 20 having a display 15 disposed on a front surface thereof, and a cover 30 assembled on the housing 20 to form the overall exterior (appearance) of the mobile terminal. The cover 30 has a size and a shape for constituting a front surface of the mobile terminal 10 together with the display 15.

Preferably, the display 15 is formed as a mirror in order to reflect light when the display 15 is turned off. Namely, an external window of the display 15 is made of a partially reflective material to allow an internal light to pass therethrough and reflect light coming from outside so that a user can use the display 15 as the mirror when the display 15 is in an OFF state.

The housing 20 includes an upper housing 21 and a lower housing 22 assembled to the upper housing 21. In addition, the housing 20 may include additional members.

Figure 2:
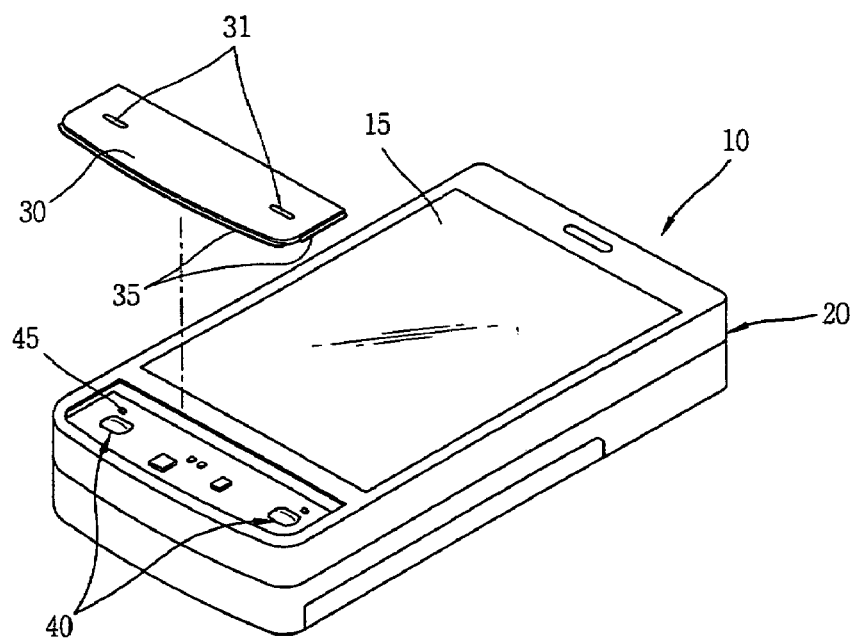
FIG. 2 is an exploded perspective view showing the separated housing and cover of the mobile terminal in FIG. 1.
Figure 4:
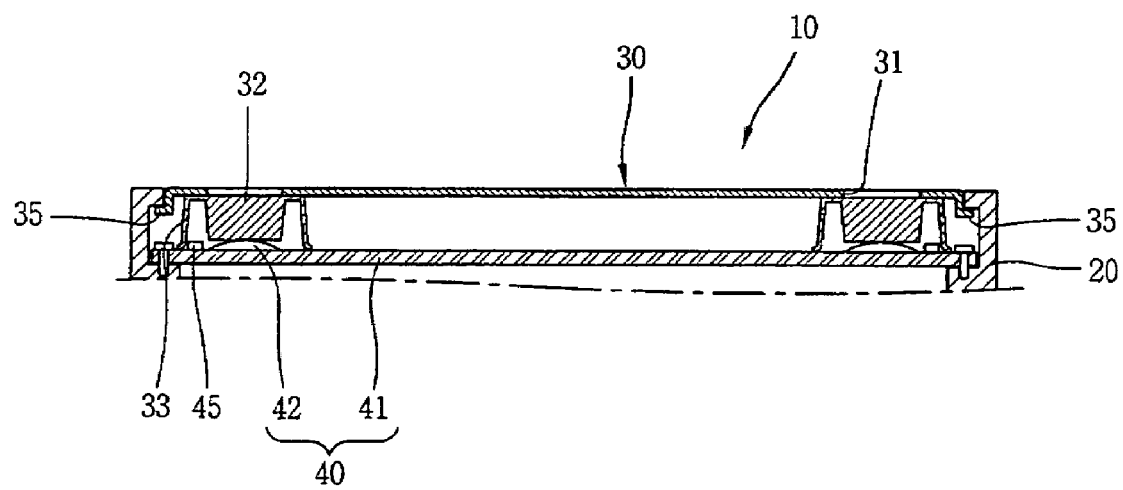
FIG. 4 is a sectional view taken along line IV-IV in FIG. 1.

As shown in FIG. 2, input switches 40 are disposed within the cover 30, and the cover 30 is installed to be deformable or movable to press the input switches 40. Accordingly, when the cover 30 is pressed, it is self-deformed or moved in a direction of to press the input switches 40. With reference to FIG. 4, the cover 30 is disposed to be movable and deformable in a pressing direction in a state that it is caught at the housing 20 by stopping portion 35 formed at an edge portion of the cover 30.

While cover 30 has been called a cover, it is not so limited to just a cover, rather it can also be take the form of a casing, case, or frame and may also be shaped into a plate, a panel, a bracket, a band, or a strip.

As shown in FIG. 4, the input switches 40 installed within the cover 30 are located on a circuitry supporting substrate 41 having a certain contact pattern and each input switch 40 is formed as a metallic dome 42 installed on the contact pattern such that it can be elastically deformable to contact the contact pattern. As the circuitry supporting substrate 41, a rigid or flexible board can be used, and a fixing sheet (not shown) can be additionally attached on an upper surface of the metallic dome 42 and the circuit board 41 to maintain the state that the metallic dome 42 is fixed on the contact pattern.

The cover 30 can be made of a thin metallic plate material with certain strength, and light transmission openings 31 are formed to indicate where the input switches 40 are positioned beneath the cover 30. A stopping portion 35 is formed at an edge portion of the cover 30. The stopping portion 35 extends in a direction away from the front surface of the mobile terminal from an edge portion of the cover 30 and then outwards to engage an interior surface of the housing 20. Accordingly, because the stopping portion 35 allows the cover 30 to be caught by the housing 20, without being exposed, the exterior of the mobile terminal can be formed fine and smooth.

Figure 3:
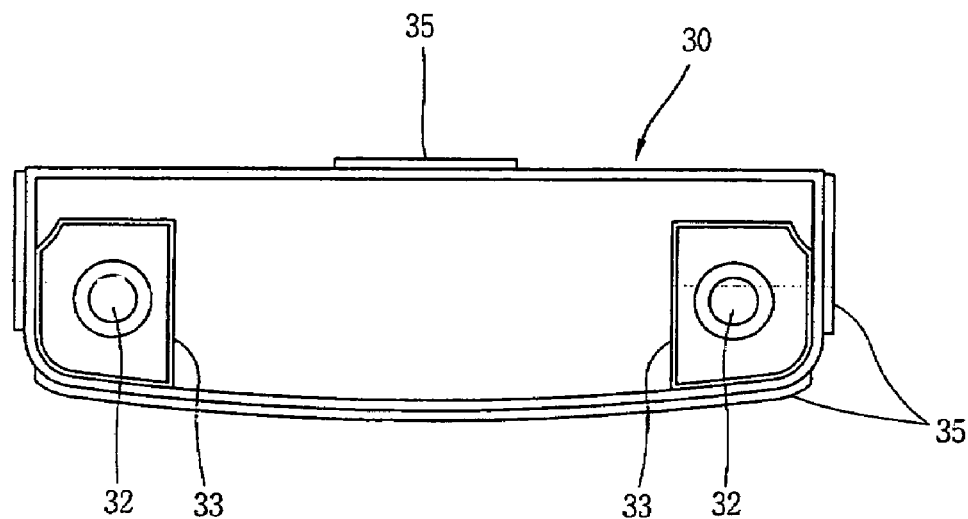
FIG. 3 is a bottom view of the cover.

As shown in FIGS. 3 and 4, pressing protrusions 32 extend toward the metallic domes 42 and are attached within the light transmission openings 31 so that when the cover 30 is pressed by a finger of a user, the input switches 40 can be easily pressed. The pressing protrusions 32 can be attached on the cover 30 by means of an adhesive or in a mating manner. Alternatively, the pressing protrusions 32 can be integrally injection-molded with the cover.

With reference to FIGS. 2 and 4, light emitters 45 are provided at one side of each of the input switches 40 to provide light to outside through the light transmission openings 31. Preferably, the light emitters 45 are formed as an element to be mounted on the circuit board 41. As the light emitters 45, light emitting diodes (LEDs) or semiconductor lasers can be used. The pressing protrusions 32 are made of a light transmissive material to allow light to pass therethrough so as to be viewable outside the mobile terminal.

As shown in FIGS. 3 and 4, shields 33 made of a light non-transmissive material are formed near the pressing protrusions 32 to prevent a light leakage from the light emitters 45. Either the pressing protrusions 32 or the shields 33 alone, or in combination, can form a light constraining member to direct light from the light emitter 45 towards the light transmission opening 31 and to minimize light emitted from the light emitter 45 from being directed peripherally of the light transmission opening 32. In this manner, the light from the light emitter 45 can be more efficiently utilized. Preferably, the pressing protrusion 32 and adjacent shield 33 can be formed as a unitary member out of a silicone material.

The shields 33 have a size that can push the cover 30 in an outward direction so that the stopping portions 35 of the cover 30 can be maintained in a state of being elastically engaging the housing 20. Accordingly, when the cover 30 is not pressed from the exterior, the cover 30 is maintained to be pressed against the housing 20 by elasticity of the shields 33. The pressing protrusions 32 can also assist in pressing the cover 30 against the housing 20.

With such a structure, as shown in FIG. 1, the cover 30 is assembled with the housing 20 to form the overall exterior of the mobile terminal 10, and as shown in FIG. 4, when a particular portion of the cover 30 is pressed, the corresponding input switch 40 is pressed to perform an inputting operation. Accordingly, there is no need to use a device having a plurality of buttons, and thus, the exterior of the mobile terminal 10 can be aesthetically improved as well as reducing the number of components.

Figure 5:
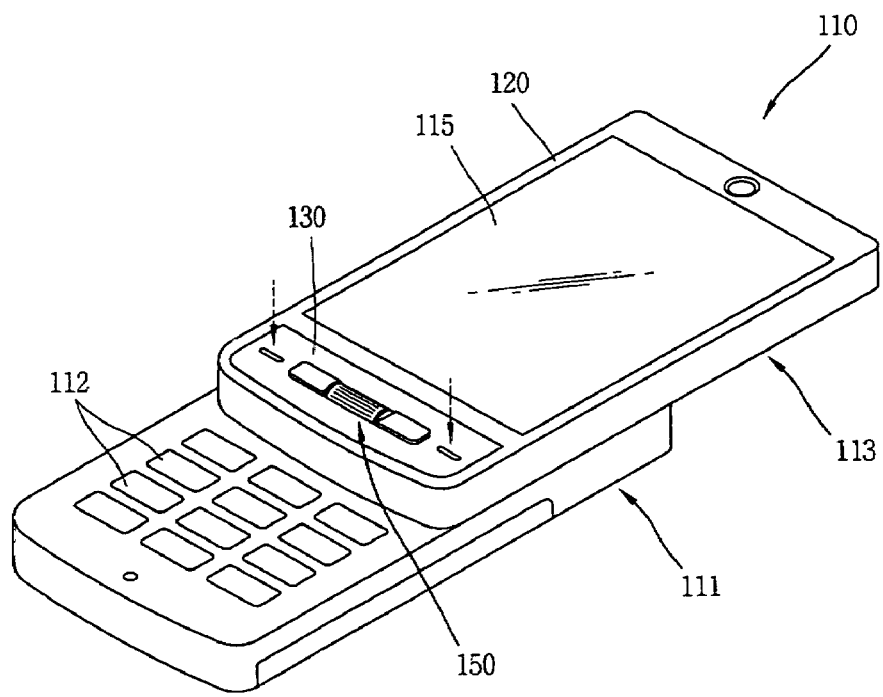
FIG. 5 is a perspective view showing a slide type mobile terminal according to a second exemplary embodiment of the present invention.

With reference to FIG. 5, a mobile terminal 110 according to a second exemplary embodiment of the present invention includes a first body 111 including a first key input unit 112 having a plurality of buttons formed on a surface that is exposed when the mobile terminal 110 is in an open position, and a second body 113 slidably movable to be opened and closed with respect to the first body 111.

Figure 6:
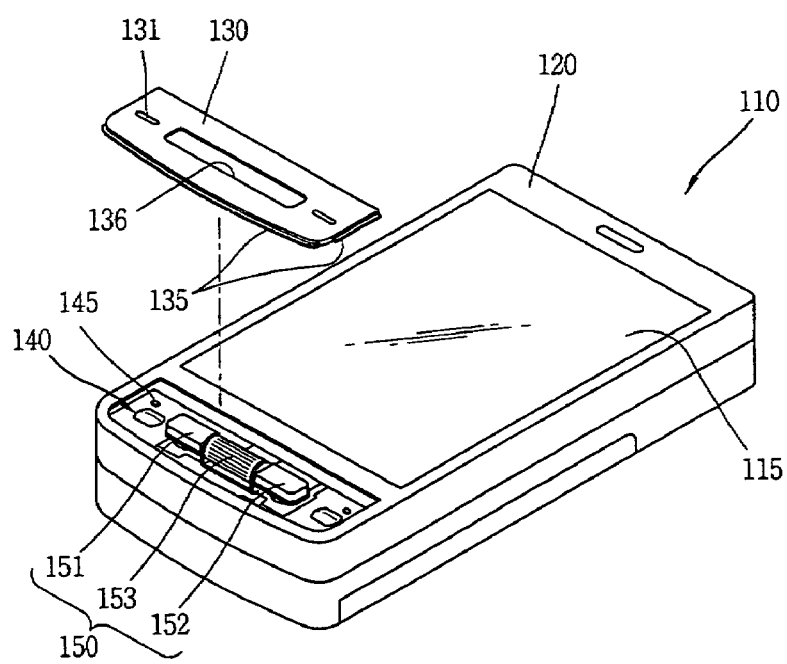
FIG. 6 is an exploded perspective view showing separated housing and cover of the mobile terminal in FIG. 5.
Figure 7:
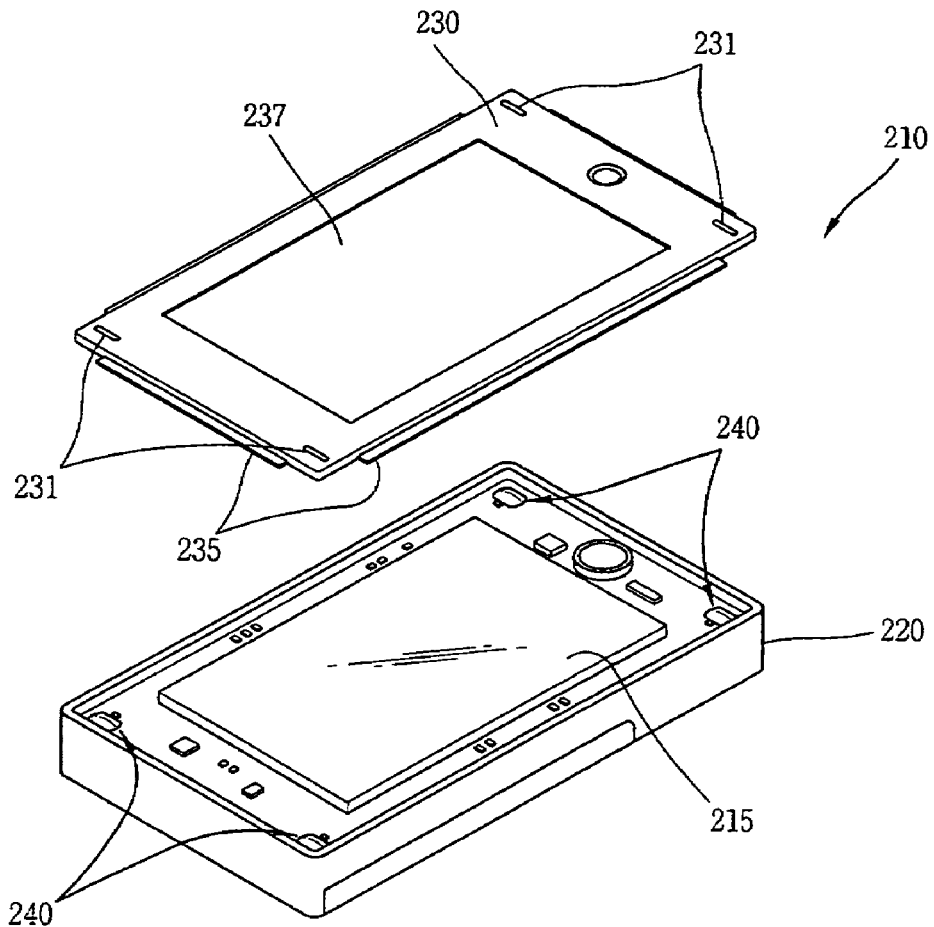
FIG. 7 is an exploded perspective view showing separated housing and cover of a mobile terminal according to a third exemplary embodiment of the present invention.

As shown in FIG. 6, the second body 113 includes a housing 120 with a display 115 disposed on its upper surface, and a cover 130 combined with the housing 120 to form the exterior of the mobile terminal 110.

A light transmission opening 136 is formed at the central portion of the cover 130, through which a second key input unit 150 including pressing buttons 151 and 152 and a scroll button 153 can pass so as to be mounted in the second body 113. Namely, surrounding the second key input unit 150, the cover 130 can form an exterior of the housing and also perform an input function independent of the second key input unit 150. Stopping portions 135 are similar to stopping portions 25 described above.

Input switches 140, light emitters 145, and light constraining members located within the cover 130 have the same construction and operation as those in the first exemplary embodiment of the present invention, so a description therefore will be omitted. These elements are also the same in the third to fifth exemplary embodiments of the present invention and the light constraining members have not been shown for clarity.

Figure 8:
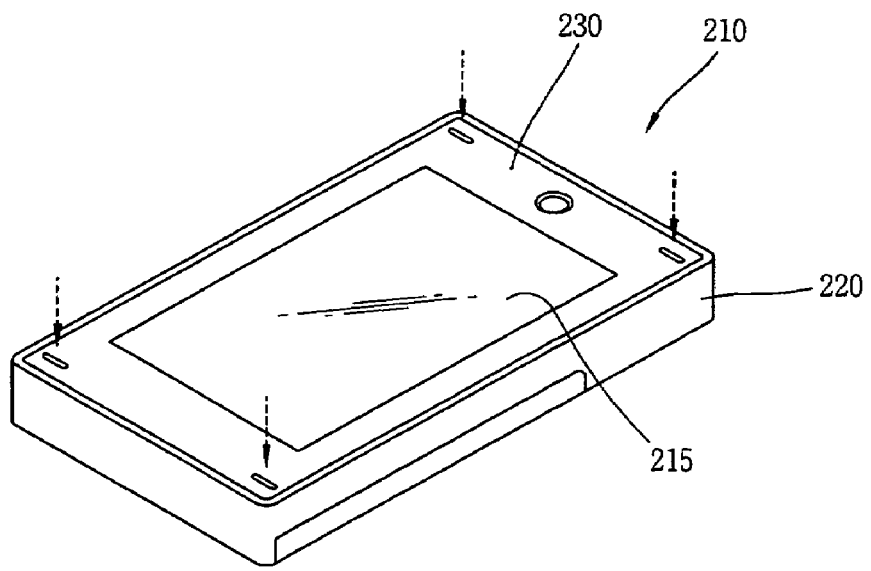
FIG. 8 is a perspective view of the mobile terminal in FIG. 7.
Figure 9:
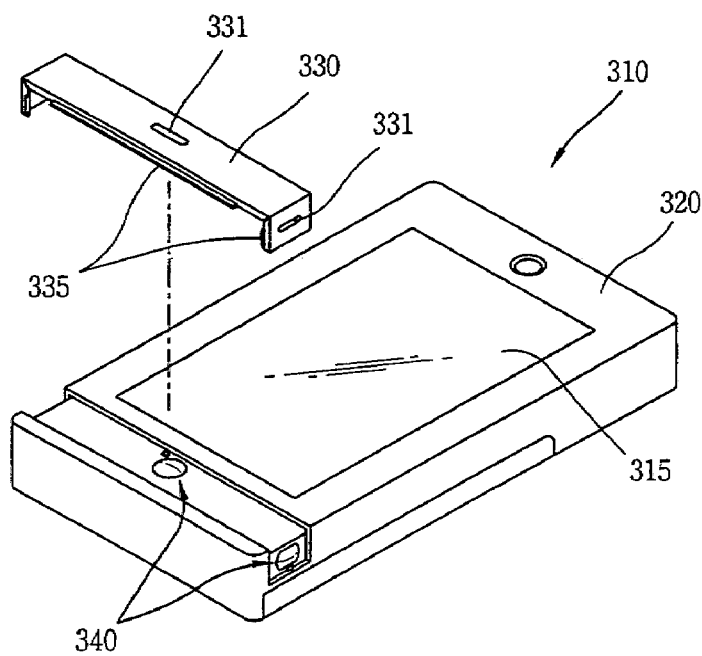
FIG. 9 is an exploded perspective view showing separated housing and cover of a mobile terminal according to a fourth exemplary embodiment of the present invention.
Figure 10:
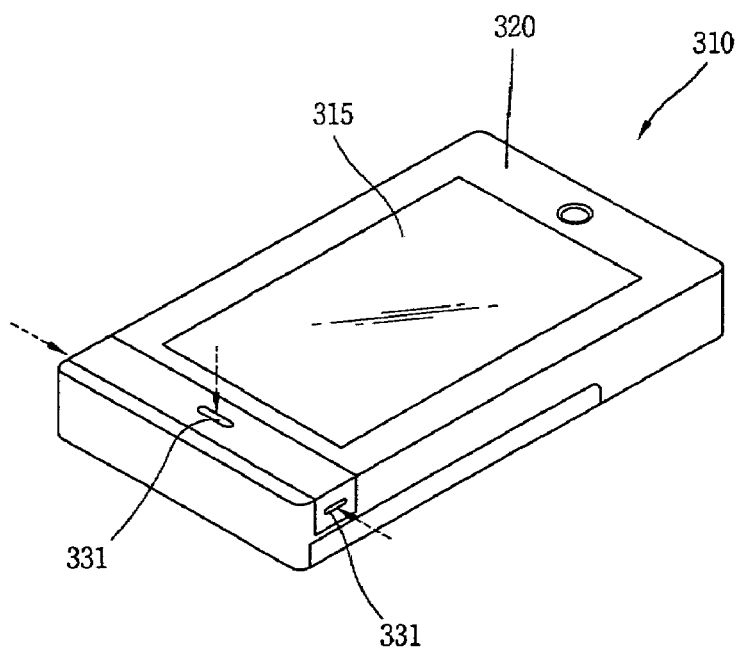
FIG. 10 is a perspective view of the mobile terminal in FIG. 9.
Figure 11:
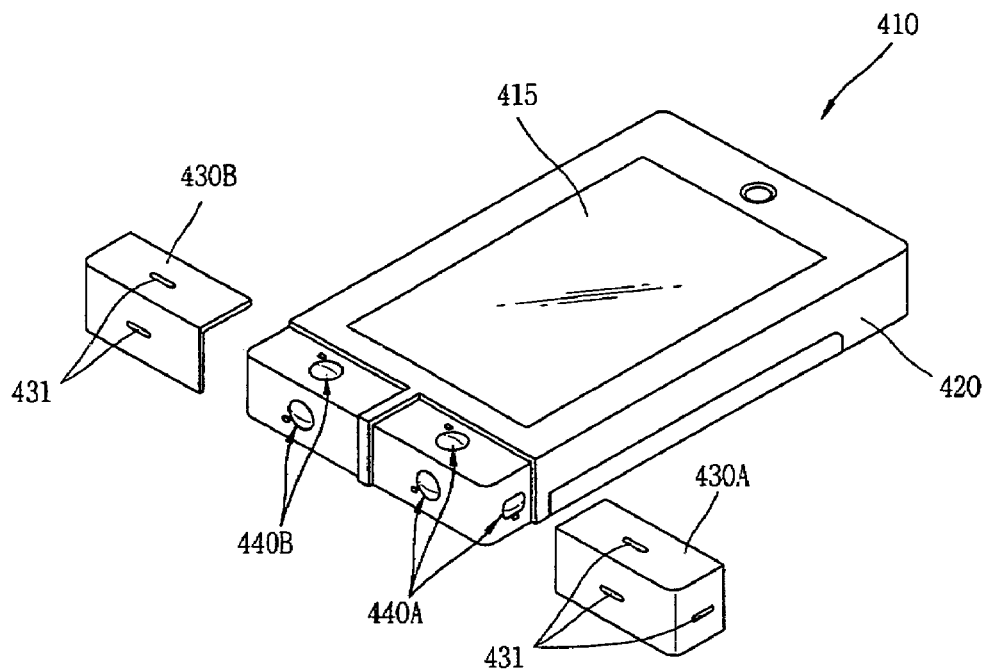
FIG. 11 is an exploded perspective view showing separated housing and covers of a mobile terminal according to a fifth exemplary embodiment of the present invention.

In the third exemplary embodiment of the present invention, a cover 230 of a mobile terminal 210 has a size and a shape constituting a front surface of the mobile terminal 210, and the housing 220 forms the other remaining exterior of the mobile terminal 210. A through hole 237 is formed at the central portion of the cover 230, on which a display 215 is disposed, so that the cover 230 surrounds the display 215 and presses input switches 240 mounted at corner positions (indicated by dotted line arrows in FIG. 8) within the cover 230. Light transmission openings 231 are formed in the corner positions of the cover 230 above the input switches 240. Stopping portions 235 are similar to stopping portions 25 described above.

In a mobile terminal 310 according to the fourth exemplary embodiment of the present invention, a cover 330 is formed as a one body at least partially including two adjacent surfaces of the mobile terminal 310. Each of the adjacent surfaces includes a light transmission opening 331 and input switch 340 associate therewith. Stopping portions 335 are similar to stopping portions 25 described above.

Accordingly, as indicated by dotted line arrows, the cover 330 can be pressed in at least two directions to performing inputting.

Figure 12:
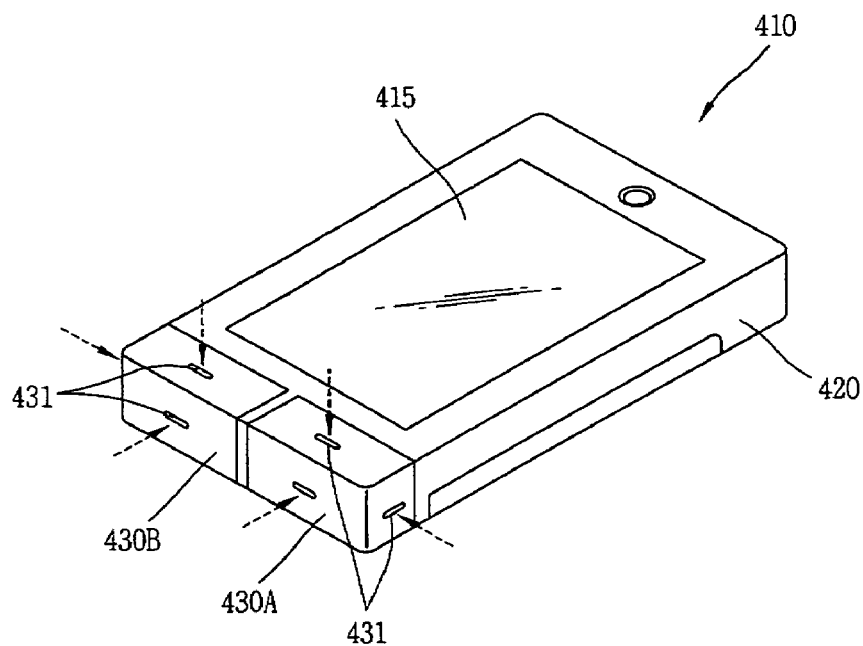
FIG. 12 is a perspective view of the mobile terminal in FIG. 11.

In the fifth exemplary embodiment of the present invention, the cover is formed as two cover portions 430A and 430B. Each of the cover portions 430A and 430B is formed as one body at least partially including three adjacent surfaces of the mobile terminal. Input switches 440A and 440B are installed at an inner side of each adjacent surface. Accordingly, the cover 330 can be pressed in the three directions as indicated by the dotted line arrows in FIG. 12 to perform an inputting operation. Light transmission openings 431 are provided on the adjacent surfaces, each being associated with corresponding input switches 440A and 440B. Stopping portions 435 are similar to stopping portions 25 described above.

Accordingly the present invention provides the following effects and advantages.

Because the cover forming the exterior of the mobile terminal is installed to be deformable or movable to press the input switches disposed within the housing, the cover can replace a general key input unit that has many different contours, and thus, the exterior of the mobile terminal can be aesthetically enhanced.

Because the pressable cover can surround the display or an additional key input unit and can be integrally formed including two adjacent surfaces of the mobile terminal, inputting operations can be performed in various directions and positions.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal comprising:
a housing having an opening formed therein;
a metallic dome located beneath the opening of the housing, the metallic dome being on a circuitry supporting substrate;
a cover enclosing the opening of the housing, the cover including at least one light transmission opening, and the cover being deformable or moveable to press the metallic dome;
a light emitter to illuminate the at least one light transmission opening, the light emitter being on the circuitry supporting substrate;
a pressing protrusion located at an inner side of the cover, the pressing protrusion being configured to extend toward the metallic dome, and the pressing protrusion being made of a light transmissive material; and
a shield made of a light non-transmissive elastic material, the shield being provided near the pressing protrusion in order to minimize light emitted from the light emitter from being directed peripherally of the light transmission opening, and the shield being directly attached to the inner side of the cover and extending to a surface of the circuitry supporting substrate such that the metallic dome and the light emitter are enclosed by the shield,
wherein the pressing protrusion and the shield are formed as a unitary member.

2. The mobile terminal according to claim 1, wherein the cover and the housing form an exterior of the mobile terminal.

3. The mobile terminal according to claim 2, wherein a display is disposed in the housing, and the cover together with the display form a front surface of the mobile terminal.

4. The mobile terminal according to claim 3, wherein a key input unit is provided approximately at the center of the cover.

5. The mobile terminal of claim 3, wherein the display is disposed approximately at the center of the cover.

6. The mobile terminal according to claim 2, wherein the cover is formed as one body that partially includes two adjacent surfaces of the mobile terminal, each adjacent surface having a light transmission opening, and each adjacent surface having an input switch associated therewith.

7. The mobile terminal according to claim 2, wherein the cover is formed as one body that partially includes three adjacent surfaces of the mobile terminal, each adjacent surface having a light transmission opening, and each adjacent surface having an input switch associated therewith.

8. The mobile terminal according to claim 1, wherein the cover includes two cover portions.

9. The mobile terminal according to claim 8, wherein each of the cover portions is formed as one body that partially includes three adjacent surfaces of the mobile terminal, each adjacent surface having a light transmission opening, and each adjacent surface having an input switch associated therewith.

10. The mobile terminal according to claim 3, wherein the display reflects light when turned off.

11. The mobile terminal according to claim 1, wherein the metallic dome is elastically deformable to contact the contact patterns when the cover is pressed.

12. The mobile terminal according to claim 9, wherein the cover is a metallic plate.

13. The mobile terminal according to claim 1, wherein the light emitter is located adjacent the metallic dome.

14. The mobile terminal according to claim 13, wherein the shield is formed of silicone.

15. The mobile terminal according to claim 13, further comprising stopping portions that prevent the cover from being pressed outward beyond the front surface, wherein each stopping portion first extends in a direction away from the front surface of the mobile terminal from an edge portion of the cover and then outwards to engage an interior surface of the housing.

16. The mobile terminal according to claim 15, wherein the shield presses the cover such that the stopping portions contact the interior surface of the housing when no external force is applied.

\* \* \* \* \*